Aug. 9, 1966     E. E. HUNTER     3,264,752
WEB TREATING APPARATUS
Filed Jan. 2, 1964

INVENTOR.
EDWARD E. HUNTER
BY
J.B. Holden
ATTORNEY

United States Patent Office 3,264,752
Patented August 9, 1966

3,264,752
WEB TREATING APPARATUS
Edward E. Hunter, Akron, Ohio, assignor to The Goodyear Tire & Rubber Company, Akron, Ohio, a corporation of Ohio
Filed Jan. 2, 1964, Ser. No. 335,313
7 Claims. (Cl. 34—62)

This invention relates to apparatus for treating a web of fabric or other porous sheet material. In particular the invention relates to thermal conditioning of a material by application of a heated gaseous fluid such as air.

In the manufacture of elastomeric articles such as conveyor belts, dunnage bags, tires and other similar products, it is essential that a reinforcement material be strategically positioned within the article so that it can withstand the loads encountered during the useful life thereof.

The various reinforcement materials both thermoplastic and thermosetting commonly employed as reinforcement for elastomeric articles are in the form of yarns, cords and even non-woven fabrics. Such materials must undergo a rigorous conditioning or treatment prior to incorporation in a rubber product. The reinforcement materials are commonly subjected to one or more coatings of a penetrating adhesive designed to enhance the bond between the reinforcement surface and abutting elastomeric material. Following the addition of an adhesive or other conditioning agent the reinforcement material is then subjected to a heat bath in an apparatus employing generally a gaseous fluid. The term fluid as used throughout this application is intended to cover both a gaseous medium and a liquid medium. In addition to the application of heat the reinforcement cords or yarns are maintained in various states of tension and relaxation throughout the entire heat application cycle.

During the thermal conditioning of the adhesive impregnated reinforcement material precise temperatures must be maintained for given time intervals. The apparatus required to accomplish optimum thermal conditioning is necessarily complex. As a result thereof, long lengths of reinforcement web are required to completely thread the apparatus in a continuous manner.

Heretofore, reinforcement manufacturers have been confronted with a serious problem when it becomes necessary to stop the continuous flow of web material through the treatment apparatus wherein the treatment conditions are delicately balanced. When the apparatus employed to treat the reinforcement material is stopped because of power failure, or other mechanical trouble, the web of cords or yarns will be seriously affected in critical heat sensitive areas. It is therefore desirable to instantaneously reduce the heat that is applied to the reinforcement material. An immediate reduction in temperature is difficult, however, since the heat is conveyed to the cords or yarns by convection in most instances. Such heat apparatus as above described would necessitate a complete evacuation of all hot gases contiguous with the immobile web of material. It has been discovered that the reinforcement material can be kept in a damage-free state if it is quickly moved from the environment of the hot treatment gases.

The principal object of this invention is to provide means for moving critical segments of a continuous web away from a thermal conditioning zone when the web has stopped moving through the heat treating apparatus.

Another object of the present invention is to provide apparatus for moving a continuous web away from a hot zone and into a cool zone without a reduction in tension thereof.

An additional object of the present invention is to provide apparatus whereby the fluid dispensing headers can be moved with respect to the continuous web of material that is undergoing treatment.

A further object of this invention is to reduce the possibility that a reinforcement material will be damaged while being treated in a heat treatment apparatus.

The manner in which the invention accomplishes the foregoing objects as well as additional objects and advantages will be more apparent from a reading of the following description of the invention in conjunction with the reference to the accompanying drawings herein.

Figure 1:
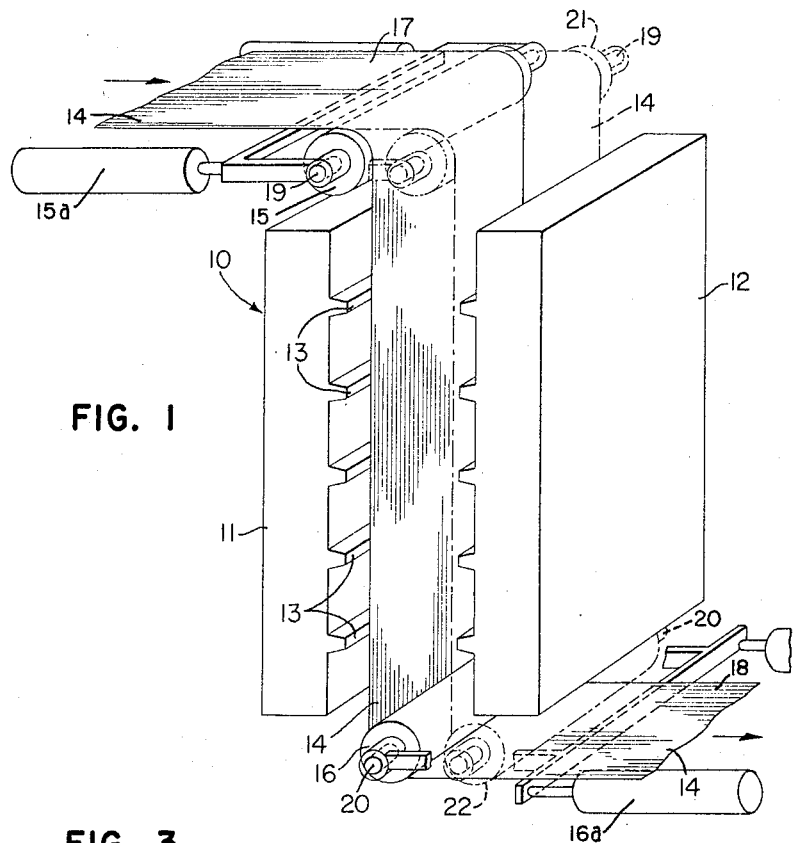
FIGURE 1 is a perspective view illustrating a preferred embodiment of the invention.

Shown in FIGURE 1 is a heating chamber generally indicated at 10. Air supply headers are represented by 11 and 12. Header 11 is shown in block form and contains a plenum chamber with means for supplying the heating medium to discharge means or nozzles 13. The heated fluid is conveyed to heater 11 by tubes, or pipes (not shown). Header 12 is similar to header 11 except that it conveys a fluid at a temperature much reduced with respect to the temperature of the fluid discharged from the header 11. The fabric web which is subjected to treatment is shown at 14. Web 14 is trained over web support or rolls 15 and 16 which align or locate it in a direction substantially parallel to headers 11 and 12. After web 14 has traveled the length of the heating chamber 10, it is once again changed in direction by roll 16. The incoming portion 17 of web 14 and exiting portion 18 are shown in the drawing as parallel to each other. While this is a convenient arrangement it is readily apparent that portions 17 and 18 can be angularly disposed with respect to each other. Rolls 15 and 16 are supported at their ends 19 and 20, respectively, which in turn are mounted by any convenient means that will permit movement normal to the longitudinal axis of headers 11 and 12 suitable drive or actuating means, such as hydraulic motors 15a, 16a, are connected to the rolls 15, 16 to move the same in the direction desired.

During normal operation web 14 is trained over rolls 15 and 16 so that it is in close relationship to nozzles 13 which impinge a flow of hot fluid against moving web 14. When web 14 stops rolls 15 and 16 immediately move to assume positions as indicated by broken lines at 21 and 22. Rolls 15 and 16 can be moved simultaneously or roll 16 can proceed roll 15 in moving away from the hot zone since the web material about to pass over roll 16 has been more fully treated, hence more subject to damage because of over-exposure to thermal conditioning. When roll 16 is moved alone, the tension in the web still can be maintained by moving roll 16 in an arcuate path rather than in a straight line.

Figure 2:
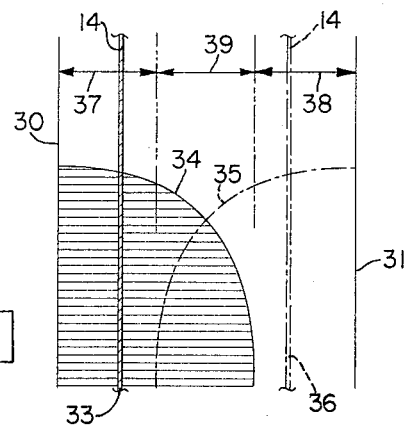
FIGURE 2 is a pictorial graph showing the hot and cool zones within the heat treating apparatus.

FIGURE 2 is a pictorial representation showing the hot and cool zones within the heat treating apparatus. Line 30 represents hot header 11 and line 31 in a similar manner represents cool header 12. The edge of web 14 is shown at 33. The area beneath curve 34 is the thermal conditioning zone produced by the hot fluid exiting from nozzles 13 as shown in FIGURE 1. Curve 35 which overlaps curve 34 is a zone of cool fluid conveyed by the nozzles of header 12. The span represented by 37 is the effective high temperature zone and in a similar manner 38 is the cool or hold temperature zone. A mixed air return zone 39 spans the distance between zones 37 and 38. When web 14 is no longer moving through the thermal conditioning apparatus it can be moved to the cool, or hold temperature zone position as represented by 36. As web 14 moves through the thermal conditioning zone its porous nature permits the high velocity fluid from nozzles 13 to actually pass through the spaces existing between individual cords and form a curtain of turbulent fluid behind the cords, thus heating the side of the web most remote from the header. The flow of fluid through web 14 also forms a wall against which the fluid from the opposite header impinges. In this manner two distinct temperature zones are created as a result of the passage of the fluid through the web of material that is undergoing heat treatment.

Figure 3:
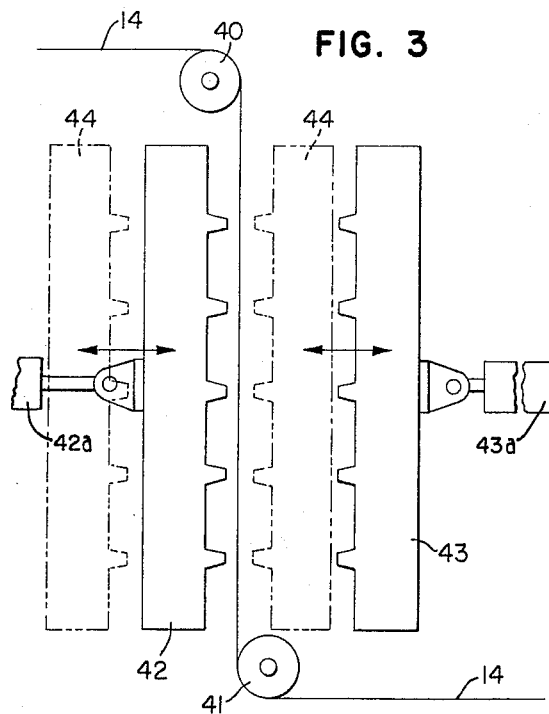
FIGURE 3 shows an alternate embodiment of the present invention.

FIGURE 3 is a schematic side-view showing an alternate embodiment of the present invention. Web 14 is trained over rolls 40 and 41 each having axles that are non-translatable. Solid lines 42 and 43 represent hot and cool headers respectively. As shown, web 14 is passing in close proximity to the nozzles of hot header 42. When the treatment of web 14 is halted headers 42 and 43 move relative to web 14 in such a manner that web 14 is positioned within the influence of the cool fluid emanating from header 43. The position assumed by headers 42 and 43 during the hold period is depicted by dotted lines 44. The headers may be moved in the direction desired by any suitable device or actuating means; for example, by hydraulic motors 42a, 43a connected thereto.

The above described thermal apparatus and the embodiment thereof provide a rapid and economical method of removing a web of fabric from a hot environment once the web has been immobilized during the heat treatment process. The movement of the rolls is independent of the tension maintained on the web as it undergoes treatment. This is important in many treatment processes since tension is often an essential part of the overall web conditioning process.

While certain representative embodiments and details have been shown for the purpose of illustrating the invention, it will be apparent to those skilled in this art that various changes and modifications may be made therein without departing from the spirit or scope of the invention.

What is claimed is:

1. In a continuous web treating apparatus, first fluid dispensing means, second fluid dispensing means arranged in opposed relationship to said first fluid dispensing means, web supporting means capable of supporting a continuous web as it passes between said first and second dispensing means, means to move said web supporting means so that the web is moved away from said first dispensing means and toward said second dispensing means.

2. In a continuous web treating apparatus, first fluid dispensing means, second fluid dispensing means arranged in opposed spaced relationship to said first fluid dispensing means and adapted to discharge fluid at a temperature different from that of the fluid discharged from said first dispensing means, web supporting means capable of supporting a continuous web as it passes in close proximity to said first and remote from said second fluid dispensing means, means to move said dispensing means so that the continuous web is positioned in close proximity to said second dispensing means whereby it is no longer under the influence of the temperature of the fluid emanating from said first dispensing means.

3. In a continuous web treating apparatus, a first header having a plurality of fluid dispensing nozzles, a second header substantially parallel to said first header and having a plurality of fluid dispensing nozzles so arranged as to face the nozzles of said first header, a pair of rotatable rolls positioned at respective ends of said headers and carrying a continuous web of material between said headers and parallel thereto, actuating means connected to said rolls to move the same in a direction such that the web is moved from a parallel position adjacent the first header to a position adjacent the second header.

4. In a continuous web treating apparatus first and second headers arranged in spaced apart parallel relationship to each other and having fluid dispensing nozzles on adjacent header sides, a pair of rotatable web carrying rolls positioned so as to train a web of material between the headers and parallel thereto, actuating means connected to said headers to move said first header away from the web and said second header a corresponding distance toward said web.

5. Thermal conditioning apparatus for treating a moving web comprising a pair of spaced apart fluid dispensing means for discharging fluids of different temperatures in opposite directions and toward the opposite sides respectively of a web disposed in and movable through the space between said pair of dispensing means, and means for effecting relative movement between the web and said pair of dispensing means in a direction generally corresponding to the direction of the discharge of fluid from said dispensing means.

6. Thermal conditioning apparatus for treating a moving web comprising a pair of fluid dispensing means each having a plurality of fluid discharge means, said pair of dispensing means being arranged in parallel spaced relation to permit a web to be moved therebetween whereby the fluid discharged thereupon will act on opposite sides respectively of the web, one of said dispensing means being adapted to discharge fluid at a temperature different from that of the fluid discharged from the other of said dispensing means, a web support for supporting and locating a web in the space between said dispensing means, and means to effect relative movement between said web support and said dispensing means to vary the spacing of a web supported by said web support from said discharge means.

7. In a continuous web treating apparatus, means providing a space through which a web may be moved and a pair of fluid discharge means arranged to discharge fluid at different temperatures toward opposite sides respectively of the web, means for supporting a moving web in said space, and means for effecting relative movement between the web and discharge means to remove the web from the temperature environment produced by one of said discharge means and into the temperature environment produced by the other of said discharge means.

References Cited by the Examiner

UNITED STATES PATENTS

| | | | |
|---|---|---|---|
| 1,144,896 | 6/1915 | Fosbraey | 34—62 |
| 2,780,878 | 2/1957 | Sandborn | 34—159 |
| 2,900,738 | 8/1959 | Offen | 34—60 |
| 2,973,635 | 3/1961 | Speers | 68—5 |
| 3,074,261 | 1/1963 | Wilcox | 68—5 |
| 3,085,414 | 4/1963 | Wendler | 68—5 |
| 3,124,429 | 3/1964 | Alexeff | 68—5 |
| 3,134,158 | 5/1964 | Marks | 26—3 |

WILLIAM J. WYE, *Primary Examiner.*